(12) United States Patent
Frost et al.

(10) Patent No.: US 11,490,203 B2
(45) Date of Patent: Nov. 1, 2022

(54) ACTIVE FOCUSED FIELD SOUND SYSTEM

(71) Applicant: B/E Aerospace, Inc., Winston-Salem, NC (US)

(72) Inventors: Ian L. Frost, Winston-Salem, NC (US); David J. Druckman, Bisbee, AZ (US)

(73) Assignee: B/E Aerospace, Inc., Winston-Salem, NC (US)

( * ) Notice: Subject to any disclaimer, the term of this patent is extended or adjusted under 35 U.S.C. 154(b) by 660 days.

(21) Appl. No.: 16/514,102

(22) Filed: Jul. 17, 2019

(65) Prior Publication Data
US 2021/0021932 A1    Jan. 21, 2021

(51) Int. Cl.
| | |
|---|---|
| H04R 5/02 | (2006.01) |
| B60R 11/02 | (2006.01) |
| B60R 13/08 | (2006.01) |
| H04R 3/12 | (2006.01) |
| H04R 11/02 | (2006.01) |
| B60R 11/00 | (2006.01) |

(52) U.S. Cl.
CPC ............ *H04R 5/02* (2013.01); *B60R 11/0217* (2013.01); *B60R 13/0823* (2013.01); *H04R 3/12* (2013.01); *H04R 11/02* (2013.01); *B60R 2011/0015* (2013.01); *H04R 2499/13* (2013.01)

(58) Field of Classification Search
CPC . H04R 5/02; H04R 3/12; H04R 11/02; H04R 2499/13; B60R 11/0217; B60R 13/0823; B60R 2011/0015
USPC ..................................................... 297/217.4
See application file for complete search history.

(56) References Cited

U.S. PATENT DOCUMENTS

| | | | |
|---|---|---|---|
| 7,373,020 B2 | 5/2008 | Tsukioka | |
| 8,879,760 B2 | 11/2014 | Bleacher et al. | |
| 2004/0237111 A1 | 11/2004 | Iraclianos et al. | |
| 2005/0259831 A1 | 11/2005 | Hutt et al. | |
| 2008/0037803 A1* | 2/2008 | Breed | H04R 5/02 |
| | | | 381/86 |
| 2014/0241534 A1* | 8/2014 | Zielinski | H03G 5/165 |
| | | | 381/57 |
| 2015/0350758 A1* | 12/2015 | Zhao | H04R 3/005 |
| | | | 381/86 |

FOREIGN PATENT DOCUMENTS

| | | | |
|---|---|---|---|
| EP | 3454577 | * | 3/2019 |
| JP | H0215800 | * | 1/1990 |

\* cited by examiner

*Primary Examiner* — Mark R Wendell
(74) *Attorney, Agent, or Firm* — Suiter Swantz pc llo

(57) ABSTRACT

A passenger suite for an aircraft passenger cabin includes a seat having an adjustable backrest, multiple forward sound drivers, left side drivers, right side drivers, at least one sensor detecting the position of the backrest, and a controller in communication with the drivers and operable to adjust an output of at least one of the drivers based on the position of the backrest. A third driver may be positioned within or behind the seat in communication with the controller. The forward drivers may be tweeter drivers; the side drivers may be midrange drivers; and the third driver may be a woofer driver. In some embodiments, a particular left side driver and a particular aligned right side driver are active to deliver audio content according to the position of the backrest. A surround sound system installable in an aircraft cabin, such as within an aircraft passenger suite.

14 Claims, 5 Drawing Sheets

ACTIVE FOCUSED FIELD SOUND SYSTEM

BACKGROUND

Aircraft seating arrangements are typically closely arranged for economic and space efficiency. Such arrangements accordingly situate seated passengers in close proximity. Passenger suites and partition walls and such are sometimes offered, for example as associated with seating classes, thus providing some passengers with a perception of limited privacy. However, whether direct eye contact and other visibility among partitioned passenger areas is limited or prevented, sound escaping one passenger area and entering another negatively impacts passenger privacy and comfort.

In-flight media selections were historically made by airline operators, such that, once passengers purchased their travel tickets, they had little or no remaining choices to make with regard to media content viewed on shared screens. Music selections were sometimes available from among limited audio content channels provided via headphone ports and selectors mounted on armrests. Modern travelers, however, expect streaming media content, or at least expect to use their own media devices. Thus, where passengers are closely situated, and each passenger is enjoying particularly preferred media, headphones are typically used to isolate the sounds of the media.

However, passengers do not always have their own headphones, and some passengers simply prefer to enjoy media without headphones. Accordingly, the comfort and media enjoyment of nearby passengers are placed in conflict.

Accordingly, improvements are needed in privacy accommodations among passengers permitting each to enjoy particular media without sound conflict and without mutual disturbance.

SUMMARY OF THE INVENTIVE ASPECTS

To achieve the foregoing and other advantages, the inventive aspects disclosed herein are directed to a passenger suite for an aircraft passenger cabin, the passenger suite including a seat having an adjustable backrest at a position pivotable from an upright position to at least one reclined position, multiple first drivers forward of the seat, multiple left-side second drivers positioned laterally left relative to a center plane of the seat, multiple right-side second drivers positioned laterally right relative to the center plane of the seat, at least one sensor detecting the position of the backrest, and a controller in communication with the first drivers, left-side second drivers, right-side second drivers, and at least one sensor, the controller operable to adjust an output of at least one of the drivers based on the position of the backrest.

In some embodiments, at least one third driver is mechanically coupled to the seat and in communication with the controller.

In some embodiments, the first drivers include tweeter drivers, the second drivers include midrange drivers, and the at least one third driver includes a woofer driver.

In some embodiments, the first drivers are laterally spaced relative to each other.

In some embodiments, the multiple first drivers include: a left first driver positioned forward relative to the seat and laterally left relative the center plane of the seat; and a right first driver positioned forward relative to the seat and laterally right relative the center plane of the seat.

In some embodiments, the first drivers are directed to converge respective sound fields toward the center plane of the seat.

In some embodiments, the left-side second drivers are spaced relative to each other at positions in correspondence with at least the upright position and the at least one reclined position of the seat, and, the right-side second drivers are spaced relative to each other at positions in correspondence with at least the upright position and the at least one reclined position of the seat.

In some embodiments, the left-side second drivers are spaced along an arc corresponding to a path of travel of the backrest as the backrest pivots from the upright position to the at least one reclined position, and the right-side second drivers are spaced along an arc corresponding to a path of travel of the backrest as the backrest pivots from the upright position to the at least one reclined position.

In some embodiments, a particular left second driver and a particular right second driver are active to deliver audio content according to the position of the backrest.

In some embodiments, the particular left second driver and the particular right second driver are aligned with each other.

In some embodiments, the controller activates the particular left second driver and the particular right second driver based on the position of the backrest.

In some embodiments, the third driver is mounted within the backrest.

In some embodiments, the third driver is mounted within a headrest mounted on the backrest.

In some embodiments, the controller provides active noise cancellation via at least one of the first drivers, left-side second drivers, right-side second drivers, and third driver.

In some embodiments, a sound sensor is in communication with the controller, wherein the controller provides active noise cancellation based at least on sound samples provided by the sound sensor.

In some embodiments, the sound sensor is positioned or directed to sample sound external to or entering the passenger suite.

In some embodiments, the sound sensor is positioned or directed to sample sound internal to or within the passenger suite.

In some embodiments, at least one wall section of the passenger suite includes a sound absorbing material.

In some embodiments, a vision based sensor is in communication with the controller for determining seat position, suite occupancy, or passenger head position.

In some embodiments, the controller automatically adjusts the output of at least one of the drivers based on information from the vision based sensor.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTIONS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

The below descriptions, of which the drawings are a part, detail one or more embodiments of an active focused field sound system installed in a passenger suite for private use by an occupant or multiple occupants. By actively focusing or delivering sound particularly to the intended listening area, for example into or near the head and upper body of the occupant, sound leakage beyond the intended listening area, for example sound leakage into an adjacent aisle or nearby other seats and passenger suites, is minimized. Active aspects of the sound system are complemented by passive elements of the seat arrangement, such as sound acoustic treatments that absorb or otherwise abate unwanted sound transmission and/or reflection. Thus, a high-quality audio listening environment is defined for occupants of a passenger suite, while sound leakage that might otherwise disturb or distract other passengers is minimized or prevented.

Multiple active sound system elements and multiple passive acoustic treatments are detailed in the descriptions, which should be taken as cumulative and non-limiting, such that any and all elements and treatments can be implemented in any combination without departing from the scope of these descriptions.

Figure 1:
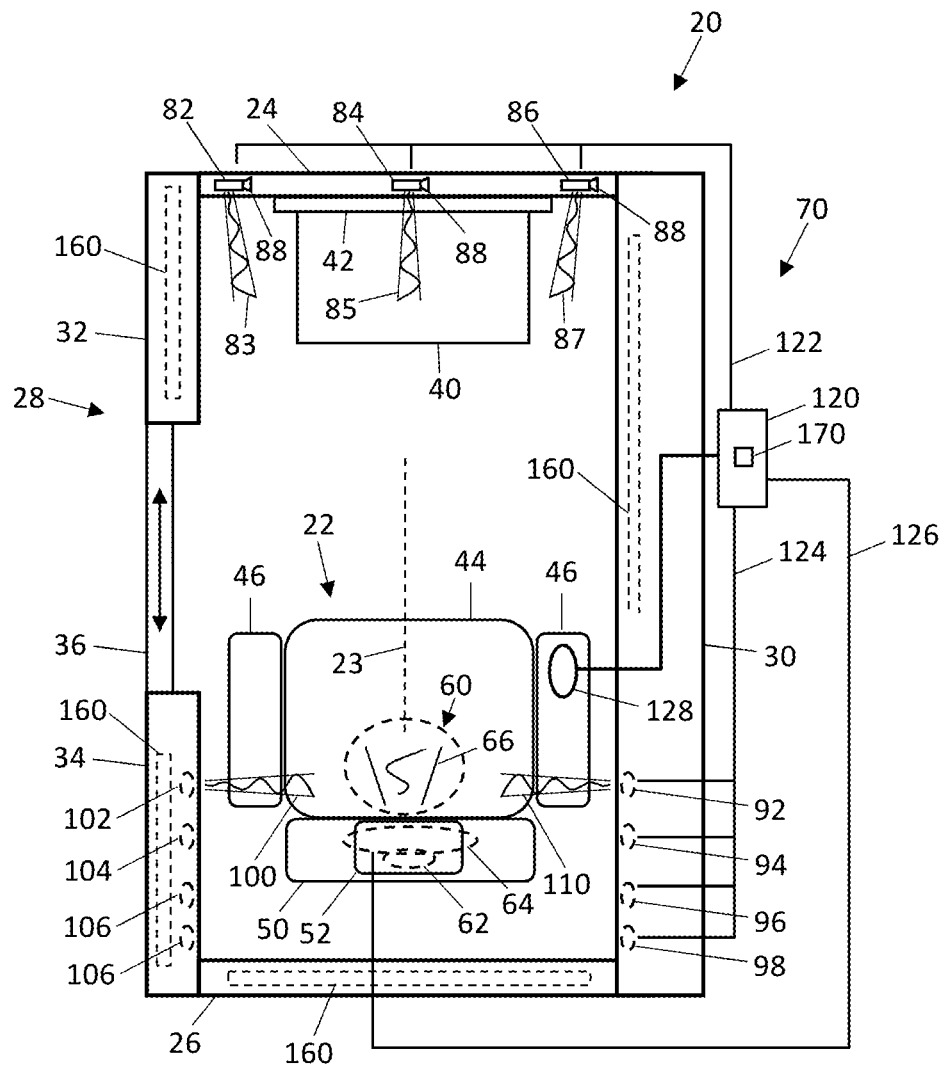
FIG. 1 is an overhead plan view of a passenger suite having an active focused field sound system according to the present disclosure.

Referring to FIG. 1, a non-limiting example of a passenger suite, for example in an aircraft cabin environment, is shown generally at reference numeral 20. The passenger suite 20 includes a passenger seat 22 and partition sections that together at least partially surround the seat. The illustrated partitioned arrangement includes a longitudinally forward first end wall 24, and a longitudinally rearward second end wall 26 opposite the first end wall 24. A left first side wall 28, and an opposing right second side wall 30 extend longitudinally between the first and second end walls 24 and 26. The illustrated walls are shown as generally planar, joined at right angles, and as together defining a rectangular partitioned interior space for use by an occupant of the seat 22. Walls in other examples can be contoured, non-planar, and can be joined at arcuate junctions to definer partitioned interior space of any shape. Although one single-occupant seat 22 is illustrated, these descriptions relate as well to suites having multiple single-occupant seats, and multiple-occupant furniture items such as benches and couches.

The walls may be of any height, from floor to ceiling, or may extend vertically approximately above the head of a seat occupant to facilitate a perception of enclosure or privacy for a passenger for example, in and below the approximate level viewing plane of the passenger. The passenger left side wall 28 is shown as having a fixed forward section 32 and a fixed rearward section 34 between which a door 36 or other movable privacy partition slides to permit opening of the side wall, for entry and exit purposes, and closure, for private use of the partitioned interior space. Representation of left and right from the perspective of a seat occupant should be understood as reversible for another embodiment of the passenger suite 20 entered and exited via the right side.

A deployed table 40 is shown extending from the first end wall toward the seat 22 for passenger use. The table 40 may be stowable by translation and/or pivoting movement into a stowage area or into alignment with a wall in a low-profile configuration. A display screen 42, for viewing media content such as movies, news, and other video feed and graphical content, is shown forward of the seat 22 and mounted to the forward first end wall 24. The display screen 42 may be used in conjunction with the below described active focused field sound system to display the video portions of multi-media content. Thus, the display screen 42 can be used to view the video portion of movies, clips, music videos and the like as an occupant of the partitioned arrangement utilizes the sound system to listen to audio portions. The below described active focused field sound system can, however, be used without the display screen 42 and can be used for audio content listening without visual content.

Figure 4:
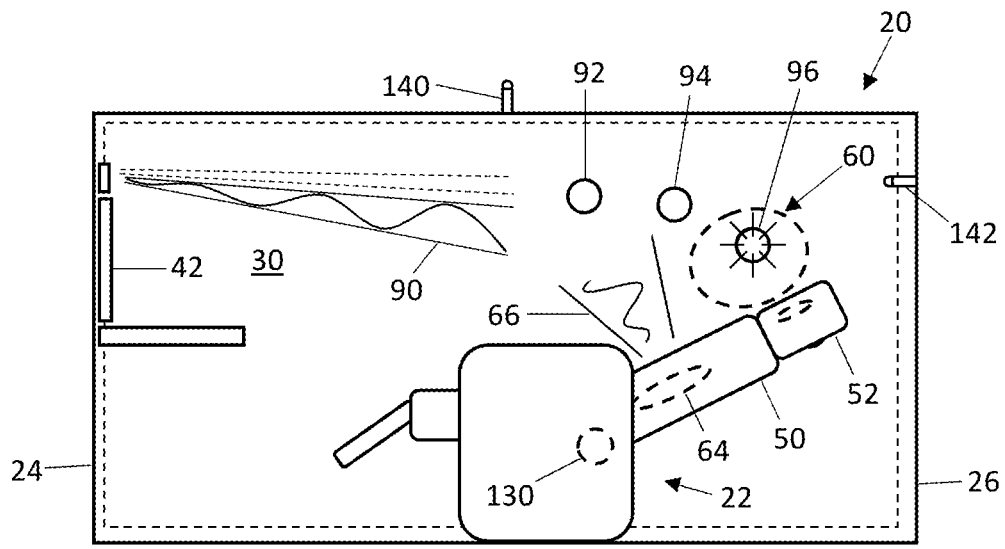
FIG. 4 is side view of the passenger suite and sound system of FIG. 1, with sound drivers selectively active and directed according to a second further reclined position of the passenger seat.
Figure 5:
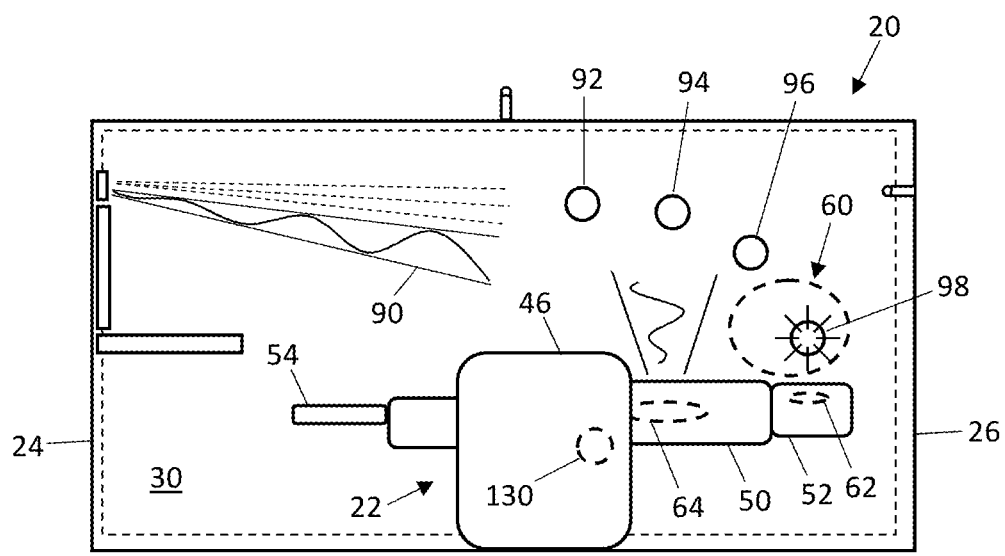
FIG. 5 is side view of the passenger suite and sound system of FIG. 1, with sound drivers selectively active and directed according to a lay back position of the passenger seat.

For purpose of description of the separate elements of the active focused field sound system, the seat 22 is illustrated as having a cushioned seat bottom 44, armrests 46 illustrated as combined with or atop as side support element, a backrest 50, and a headrest 52. The backrest 50 and headrest 52 are shown as pivoting together as a single structure relative to the seat bottom 44 and armrests 46 from a generally upright position (FIGS. 1-2), to a first reclined position (FIG. 3), a second further reclined position (FIG. 4), and a lay back or bed position (FIG. 5). The seat 22 is represented as having articulated adjustment, for example by way of the pivoting leg rest 54 shown in respective corresponding positions in FIGS. 2-5.

These descriptions refer to an intended listening area 60, which is defined immediately forward of the headrest 52 and upper portion of the backrest 50 of the seat 22, proximate the head and upper body of the occupant, particularly the areas about chest, shoulders, and ears. As the seat 22 is adjustable to reclined positions as separately represented in FIGS. 2-5, the intended listening area 60 so defined may also move with the headrest 52 and upper portion of the backrest 50 with the head of a seated or reclining passenger. Thus, the intended listening area 60 may be defined with regard to the seat and positions thereof, whether or not a passenger occupies the seat 22.

Referring now to particular active elements of the active focused field sound system 70 (FIG. 1), an array of first drivers or speakers, for example high frequency drivers or speakers, are mounted forward of the seat 22 and directed generally toward the seat. A respective sound field is pictorially represented in FIG. 1 as emanating from each first driver. The first drivers may be arranged in a line array as represented in the drawings. The first drivers may be acoustically coupled together to define a directional combined sound field to the listening area 60 of a seated passenger. Three first drivers are particularly shown in FIG. 1. A first driver 82 is laterally left of the center plane 23 of the seat and has a directional sound field 83 when active. A central first driver 84 having a directional sound field 85 when active is generally aligned with the center plane 23. A lateral right first driver 86 having a directional sound field 87 when active is generally right of the center plane. The first drivers (82, 84, 86) are shown as horizontally and laterally spaced relative to each other along or proximate the forward first end wall longitudinally forward of the seat. The lateral left first driver 82 and lateral right first driver 86 may deliver respective left and right portions of stereo audio content. The first drivers (82, 84, 86) are directed to converge their respective sound fields (83, 85, 87) horizontally toward the center plane 23 of the seat 22 as shown in FIG. 1 to combine at the intended listening area 60.

The sound fields (83, 85, 87) of the first drivers are generally vertically aligned in the drawings, being directed together from the respective first drivers at approximate equal heights to the intended listening area 60, the position of which can vary with the position of the seat 22 as the seat is reclined as represented in FIGS. 2-5. Accordingly, as represented progressively from FIGS. 2-5, the vertically aligned sound fields (83, 85, 87) of the first drivers (82, 84, 86) may be steered to be variably directed to follow the intended listening area 60 as the seat 22 is reclined. In at least one embodiment, the first drivers (82, 84, 86) are coupled to respective controlled actuators 88 that steer the first drivers to deliver their sound fields to the intended listening area 60 in any position of the seat 22. Accordingly, as shown in FIGS. 2-5, the sound fields (83, 85, 87) of the first drivers (82, 84, 86) are progressively inclined downward toward the backrest 50 or intended listening area 60 as the backrest progressively reclines. For convenience in illustration, the sound fields (83, 85, 87) of the first drivers (82, 84, 86) are together referenced as sound field 90 in FIGS. 2-5.

The active focused field sound system 70 further includes multiple second drivers or speakers for example mid or full range frequency drivers, that are positioned generally laterally relative to the center plane 23 of the seat 22. That is, multiple lateral left second drivers (102, 104, 106, 108) are mounted proximate the left side of the seat, and multiple lateral right second drivers (92, 94, 96, 98) are mounted proximate the right side of the seat. The multiple lateral right-side second drivers (92, 94, 96, 98) are expressly shown in FIGS. 2-5 as mounted on or in the right-side wall 30, and spaced along an arc along the right-side wall 30 at positions corresponding to the positions of the seat 22 represented as reclining progressively in FIGS. 2-5. The arc along which the right-side second drivers are arranged in FIGS. 2-5 corresponds to or approximately follows the path of travel intended listening area 60 and the head rest 52 of the seat 22 as the backrest is reclined.

Figure 2:
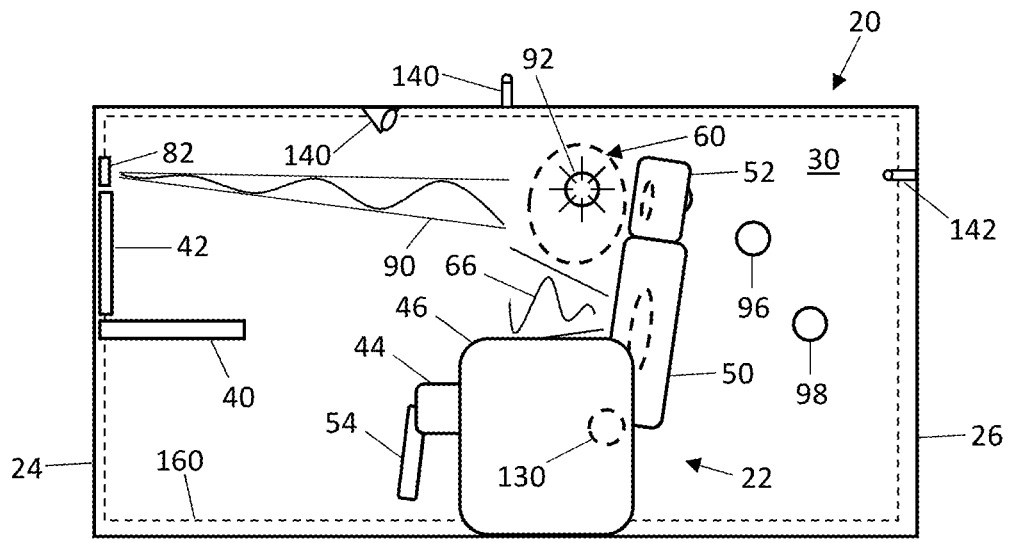
FIG. 2 is side view of the passenger suite and sound system of FIG. 1, with sound drivers selectively active and directed according to an upright position of the passenger seat.
Figure 3:
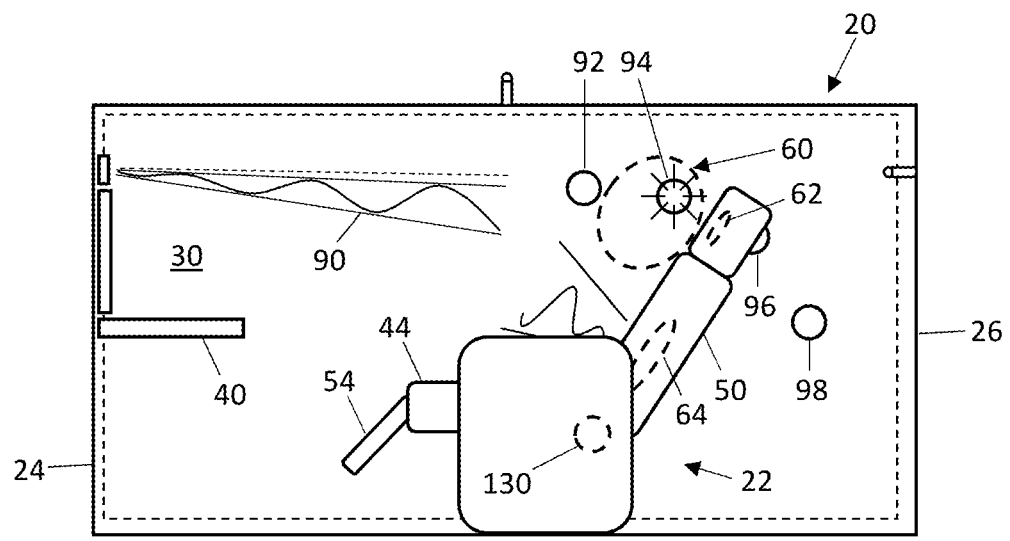
FIG. 3 is side view of the passenger suite and sound system of FIG. 1, with sound drivers selectively active and directed according to a first reclined position of the passenger seat.

A particular right second driver 92 is proximate, and directed into, the intended listening area 60 at the generally upright position (FIG. 2). Another right second driver 94 is proximate, and directed into, the intended listening area 60 at the first reclined position (FIG. 3). Another right second driver 96 is proximate, and directed into, the intended listening area 60 at the second reclined position (FIG. 4). Yet another right second driver 98 is proximate, and directed into, the intended listening area 60 at the lay back or bed position (FIG. 5).

These descriptions of the right-side second drivers (92, 94, 96, 98) extend by symmetry to the left-side second drivers (FIG. 1), of which there are right second drivers respectively proximate, and directed into, the intended listening areas at the upright position (FIG. 2), first reclined position (FIG. 3), second reclined position (FIG. 4, and lay back or bed position (FIG. 5). For example, the right-side second drivers and left-side second drivers may be respectively aligned with each other at opposing ends of along respective horizontally extending line segments that span the side walls. Thus, the left-side second drivers (102, 104, 106, 108) as illustrated are mounted on or in the fixed rearward section 34 of the left-side wall 28, and spaced along an arc along the left-side wall 28 at positions corresponding to the positions of the reclining seat 22 such that, as the seat is relined, a particular left second driver is proximate, and directed into, the intended listening area 60 at any seat position.

In at least one embodiment of the active focused field sound system, in any given position of the intended listening area 60 according to the position of the backrest 50 adjustable seat 22 and headrest 52 thereof, only one left second driver and the corresponding aligned right second driver are active to deliver audio content as illustrated in FIGS. 1-5, in which the controllably selected left and right second drivers are selected to follow and correspond to the intended listening area 60 as the seat position is adjusted. As represented in FIGS. 2-5, as the seat 22 approximately assumes the corresponding positions, only the particular left second driver (102, 104, 106, 108) most proximate the intended listening area 60 is active to deliver audio content, as represented by a left sound field 100 directed into the intended listening area 60 in FIG. 1; and only the particular the right second driver (92, 94, 96, 98) most proximate the intended listening area 60 is active to deliver audio content, as represented by a right sound field 110 directed into the intended listening area 60. Accordingly, the right second driver 92 is shown as active in FIGS. 1-2 with the seat in the upright position; the right second driver 94 is shown as active in FIG. 3 with the seat in the first reclined position; the right second driver 96 is shown as active in FIG. 4 with the seat in the second reclined position; and, the right second driver 98 is shown as active in FIG. 5 with the seat in the lay back position.

Thus, in the illustrated embodiment, only one pair of the second drivers, defined by a paired left second driver and the corresponding aligned right second driver, will be full active at any given seat position. The active left and active right second drivers may deliver separate but coordinated left and right stereo content respectively.

The active focused field sound system further includes a low frequency third driver or speaker, for example a bass driver, mechanically coupled to the seat to transmit low frequency audio directly into or proximate the seat or seat occupant. For example, a headrest mounted third driver 62 is shown as embedded in the head rest 52 for transmission directly into or from the cushion of the head rest and into the head of a seat occupant or intended listening area 60. A backrest mounted third driver 64 is also shown as embedded in the backrest 50 for transmission directly into or from the cushion of the backrest and into the lumbar area of a seat occupant or intended listening area 60.

Figure 6:
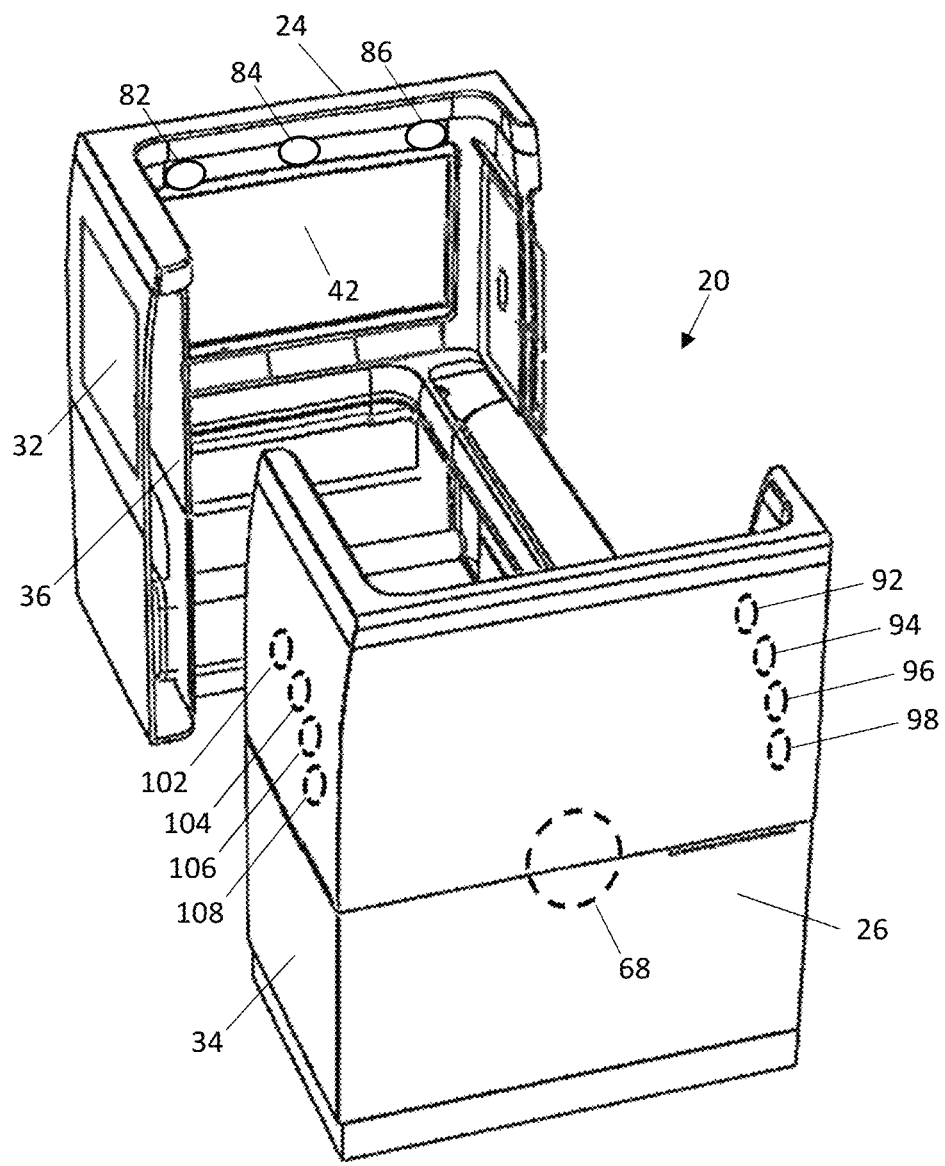
FIG. 6 is a perspective view of the passenger suite and sound system of FIG. 1.

The sound field of the third driver, whether referring to the headrest mounted third driver, backrest mounted third driver, or third driver positioned behind the seat, is directed according to the recline position of the seat 22. Accordingly, the sound field 66 of the backrest mounted third driver 64 is shown as directed outward from the backrest 50 in various positions of the reclining seat (FIGS. 2-5). The sound field 66 of the backrest mounted third driver is expressly illustrated while a sound field of the headrest mounted third driver is understood as directed into the intended listening area 60 without express illustration. The third drivers 62 and 64 need not be exclusively activated. The third drivers 62 and 64 can be active at once or alternately according, for example, to audio content being delivered. The active focused field sound system may further include additional or alternative low frequency third drivers, for example mounted in a wall or armrest. A rear wall mounted third driver 68 is shown in the example of FIG. 6.

The first drivers delivering high frequency or treble audio content may be tweeter drivers particularly suited for a high-frequency treble sound range (above 2,000 Hz). The second drivers delivering full range audio content may be midrange drivers particularly suited for a midrange of frequencies (200 Hz to 2,000 Hz). The third drivers delivering low frequency, bass, or subwoofer content may be woofer drivers particularly suited for a low-frequency bass range (below 200 Hz). The drivers are in communication with a controller 120 to receive the respective audio content and power. For example, as diagrammatically represented in FIG. 1, respective wired signal transmission paths 122, 124, and 126, each of which may be multi-wired or multi-channeled to accommodate multiple drivers, may extend from the controller 120 to the first drivers, second drivers, and third driver(s), respectively. In other embodiments, the drivers receive signals wirelessly from the controller. The controller 120 can include a receiver for wired or wireless receipt of content for delivery by audio, an amplifier for delivering powered audio signals to the drivers, a multi-channel device or processor for separating or managing multi-channel (stereo, treble, mid tone, bass) content, and an interface device 128 in electronic communication with the controller 120 for permitting user control of the active focused field sound system to, for example, select media for visual display and audio playback and to adjust sound system parameters such as volume and stereo balance.

The active focused field sound system 70 may include one or more sensors to detect seat position and/or passenger occupancy. For example, as shown in FIG. 2-5, a seat position sensor 130 in electronic communication with the controller 120 detects the recline position of the seat and the controller automatically activates the corresponding drivers, such as the second drivers, to deliver audio content to the intended listening area 60 in any position of the seat 22.

The active focused field sound system 70 may provide active noise cancellation via the first, second, and third drivers or any subset thereof, for example according to whether high frequency, mid tone, or low frequency sounds are to be canceled. As shown in FIGS. 2-5, sound sensors or microphones 140 and 142, each in electronic communication with the controller 120, may provide sound sample data for use by the controller in discriminating audio noise and generating corresponding cancellation audio content or signals for delivery by the drivers. A first microphone 140 in FIG. 2 is shown as positioned and/or directed to sample sound external to or entering the passenger suite 20, and a second microphone 142 is shown as positioned and/or directed to sample sound internal to or within the passenger suite 20.

The active focused field sound system 70 may include a vision based sensor 144, in electronic communication with the controller 120, for determining seat position, suite occupancy (defined as presence or absence of a passenger within the suite), or passenger head position so the controller can automatically adjust directional speakers to project sound only to the current location of a passenger's head, for example as indicated by the intended listening area 60.

Figure 7:
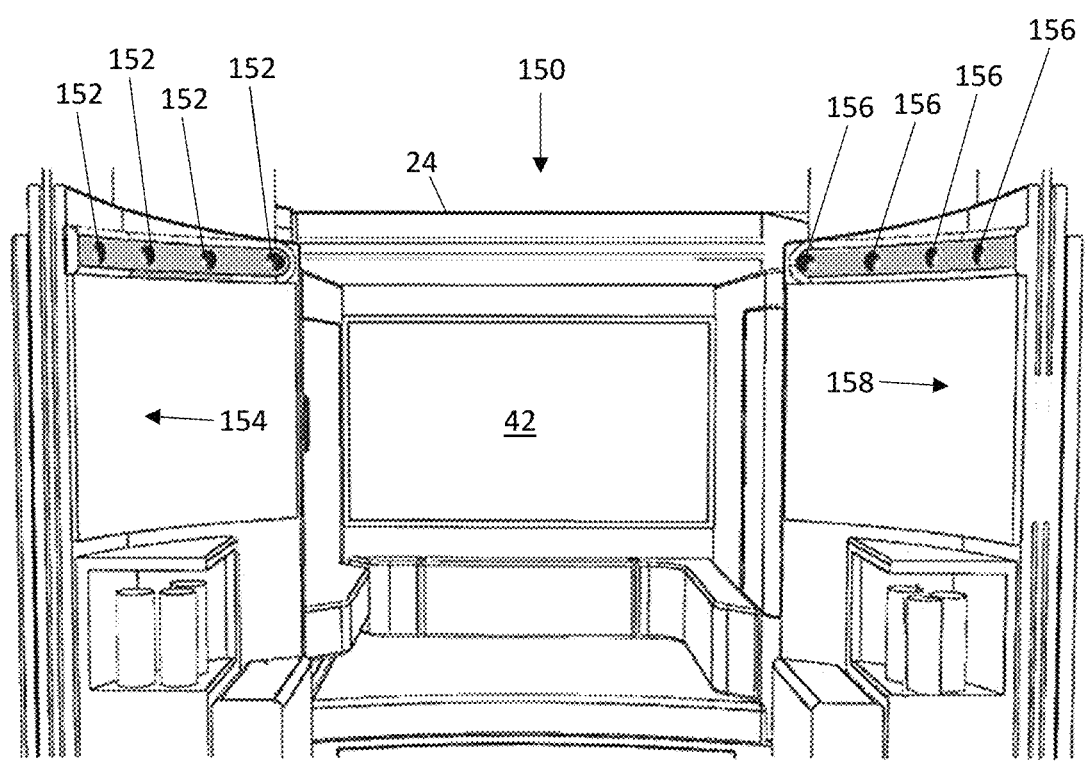
FIG. 7 is a perspective interior view of a passenger suite according to another embodiment.

The placements of the drivers shown in FIGS. 1-6 are not exclusive or limiting. Other arrangements, and other types of passenger suites, are within the scope of these descriptions. For example, the passenger suite 150 of FIG. 7 includes multiple left first drivers 152 arranged along an arcuate left side wall 154, and multiple right first drivers 156 arranged along an arcuate right sidewall 158.

Thus, the sound system can be described as an active field array, as the location of the active audio sources (the currently active drivers in any seat position) changes based on the expected location of a passenger's ears in the intended listening area 60. This reduces the required power output of the drivers to satisfy a listener's volume expectations while ensuring minimal audio leakage outside the passenger environment defined by the passenger suite 20.

Referring now to passive elements of the active focused field sound system 70 (FIG. 1), acoustic treatment of the passenger environment defined by the suite 20 can include various materials and geometries purposed to absorb stray soundwaves and prevent audio leakage from the interior of the suite to nearby areas such as other suites and passenger seats. Sound absorbing, abating, or blocking materials, referenced as treatment panels 160, are represented as embedded within or mounted upon the sections of the wall 28 and 30 in portioned areas. The treatment panels 160 and other sound absorbing, abating, or blocking treatment elements and materials can be included in other areas and structures of the passenger suites 20 and 150 including wall, floor and ceiling areas, and including seat and other passenger comfort items.

When implemented together, the above four systems (first drivers, second drivers, third drivers, and acoustic treatments) facilitate a highly focused and full range sound system the reproduces very low frequencies to very high frequencies for passenger listening while minimizing audio leakage outside the passenger environment.

The sensors described in the preceding may include sensors of the above types such as visual sensors, audio sensors, position sensors, and status sensors. Each sensor may be a device or a subsystem capable of detecting condition changes within the aircraft cabin environment and communicating with a processor 170 within or in communication with the controller 120.

The system sensors relay information to processor where processing logic analyzes the data received to control the drivers and actuators. The processor 170 may be a component of a server, such as a digital computer also including input/output (I/O) interfaces, a network interface, a data store, and memory. The components may be communicatively coupled via a local interface such as one or more buses or other wired or wireless connections. The local interface may have additional elements such as controllers, buffers (caches), drivers, repeaters, and receivers, among others, to enable communications. Further, the local interface may include address, control, and/or data connections to enable appropriate communications among the components.

The processor 170 is a hardware device for executing software instructions such as collation algorithms. The processor may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the described or inferred sensors, an aircraft network, and flight crew devices. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the server to communicate on a network, such as the Internet, a wide area network (WAN), a local area network (LAN) such as the secure aircraft network, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described or inferred herein.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A passenger suite for an aircraft passenger cabin, the passenger suite comprising:
   a seat having a backrest adjustable between an upright position and at least one reclined position;
   multiple first drivers positioned forward of the seat;
   multiple left-side second drivers positioned laterally left relative to a center plane of the seat;
   multiple, right-side second drivers positioned laterally right relative to the center plane of the seat;
   at least one sensor detecting a position of the backrest; and
   a controller in communication with the first drivers, the left-side second drivers, the right-side second drivers, and the at least one sensor, the controller operable to adjust an output of at least one of the first and second drivers based on the position of the backrest;
   wherein the left-side second drivers are spaced relative to each other at positions in correspondence with at least the upright position and the at least one reclined position of the backrest, and the right-side second drivers are spaced relative to each other at positions in correspondence with at least the upright position and the at least one reclined position of the backrest; and
   wherein the left-side second drivers are spaced along an arc corresponding to a path of travel of the backrest as the backrest pivots from the upright position to the at least one reclined position, and the right-side second drivers are spaced along an arc corresponding to a path of travel of the backrest as the backrest pivots from the upright position to the at least one reclined position.

2. The passenger suite of claim 1, further comprising at least one third driver positioned within or behind the seat, the at least one third driver in communication with the controller.

3. The passenger suite of claim 2, wherein the first drivers comprise tweeter drivers, the second drivers comprise mid-range drivers, and the at least one third driver comprises a woofer driver.

4. The passenger suite of claim 2, further comprising a sound sensor in communication with the controller, wherein the controller provides active noise cancellation based at least on sound samples provided by the sound sensor, wherein the sound sensor is positioned or directed to sample sound external to or entering the passenger suite or internal to or within the passenger suite, and wherein the controller provides active noise cancellation via at least one of the first drivers, the left-side second drivers, the right-side second drivers, and the at least one third driver.

5. The passenger suite of claim 1, wherein the first drivers are laterally spaced relative to each other and comprise:
   a left first driver positioned forward relative to the seat and laterally left relative the center plane of the seat; and
   a right first driver positioned forward relative to the seat and laterally right relative the center plane of the seat;
   wherein the first drivers are directed to converge respective sound fields toward the center plane of the seat.

6. The passenger suite of claim 1, wherein, a particular left second driver and a particular right second driver are active to deliver audio content according to the position of the backrest.

7. The passenger suite of claim 6, wherein, the particular left second driver and the particular right second driver are aligned with each other, and wherein the controller activates the particular left second driver and the particular right second driver based on the position of the backrest.

8. The passenger suite of claim 1, further comprising at least one wall section comprising sound absorbing material.

9. The passenger suite of claim 1, further comprising a vision-based sensor in communication with the controller for determining at least one of backrest position, suite occupancy, and passenger head position, the controller configured to adjust the output of at least one of the first, second and third drivers based on information from the vision-based sensor.

10. A surround sound system installable in a passenger suite, comprising:
multiple first drivers positionable forward of a seat having a backrest adjustable between an upright position and at least one reclined position;
multiple left-side second drivers positionable laterally left relative to a center plane of the seat:
multiple right-side second drivers positionable laterally right relative to the center plane of the seat;
at least one sensor positionable in the passenger suite for detecting at least one of backrest position and suite occupancy; and
a controller in communication with the first drivers, the left-side second drivers, the right-side second drivers, and the at least one sensor, the controller operable to adjust an output of at least one of the drivers based on the position of the backrest or suite occupancy;
wherein, the left-side second drivers are spaced relative to each other at positins in correspondence with at least the upright position and the at least one reclined position of the backrest, and the right-side second drivers are spaced relative to each other at positions in correspondence with at least the upright position in correspondence with at least the upright position and the at least one reclined position of the backrest, and the right-side second drivers are spaced relative to each other at positions in correspondence with at least the upright position and the at least one reclined position of the backrest;
wherein the left-side second drivers are spaced along an arc corresponding to a path of travel of the backrest as the backrest pivots from the upright position to the at least one reclined position, and the right-side second drivers are spaced along an arc corresponding to a path of travel of the backrest as the backrest pivots from the upright position to the at least one reclined position; and
wherein a particular left second driver and a particular right second driver are activated by the controller to deliver audio content according to the position of the backrest.

11. The surround sound system of claim 10, further comprising at least one third driver in communication with the controller, the third driver positionable, behind the seat or within the seat.

12. The surround sound system of claim 10, wherein the first drivers are laterally spaced relative to each other and include a left first driver positionable forward relative to the seat and laterally left relative the center plane of the seat, a right first driver positionable forward relative to the seat and laterally right relative the center plane of the seat, and a center driver positionahle forward relative to the seat and aligned with the center plane of the seat, wherein the first drivers are directed to converge respective sound fields toward the center plane of the seat.

13. The surround sound system of claim 11, further comprising a sound sensor in communication vyith the controller, wherein the controller provides active noise cancellation based at least on sound samples provided by the sound sensor, wherein the sound sensor is positionabie or directed to sample sound external to or entering the passenger suite or internal to or within the passenger suite, and wherein the controller provides active noise cancellation via at least one of the first drivers, left-side second drivers, right-side second drivers, and the at least one third driver.

14. The surround sound system of claim 11, further comprising a vision-based sensor in communication with the controller for determining at least one of backrest position, suite occupancy, and passenger head position, the controller configured to adjust the output of at least one of the first, second and third drivers based on information from the vision-based sensor.

* * * * *